United States Patent
Demots et al.

(10) Patent No.: US 9,593,647 B2
(45) Date of Patent: Mar. 14, 2017

(54) GAS-TO-LIQUID HEAT EXCHANGER

(71) Applicant: FORD GLOBAL TECHNOLOGIES, LLC, Dearborn, MI (US)

(72) Inventors: Anthony Bernard Demots, London (GB); Martin James Styles, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 417 days.

(21) Appl. No.: 13/855,233

(22) Filed: Apr. 2, 2013

(65) Prior Publication Data
US 2013/0263829 A1  Oct. 10, 2013

(30) Foreign Application Priority Data

Apr. 5, 2012  (GB) .................................. 1204677.7

(51) Int. Cl.
*F02M 31/20* (2006.01)
*F28F 1/12* (2006.01)
(Continued)

(52) U.S. Cl.
CPC ......... *F02M 31/20* (2013.01); *F02B 29/0462* (2013.01); *F28D 7/0041* (2013.01);
(Continued)

(58) Field of Classification Search
CPC .. F28F 1/325; F28F 9/001; F28F 1/128; F28F 1/126; F28F 13/08; F28F 1/12;
(Continued)

(56) References Cited

U.S. PATENT DOCUMENTS 2,429,508 A * 10/1947 Belaieff ................ F28D 1/0366
165/125
2,792,200 A * 5/1957 Huggins ............... F28D 9/0018
165/10
(Continued)

FOREIGN PATENT DOCUMENTS

CN   101441041 A   5/2009
DE   3508240 A1    9/1986
(Continued)

OTHER PUBLICATIONS

Intellectual Property Office, Search Report for the corresponding Great Britain Application No. GB 1220564.7 mailed Mar. 20, 2013.
(Continued)

*Primary Examiner* — Allana Lewin Bidder
*Assistant Examiner* — Raheena Rehman
(74) *Attorney, Agent, or Firm* — Greg P. Brown; Brooks Kushman P.C.

(57) ABSTRACT

An intercooler for an internal combustion engine has a fin-and-tube block including a plurality of flat heat transfer units having internal fluid passages orientated transversely to the direction of air flow, and arranged parallel to one another to define gaps therebetween. Fin units are disposed in the gaps and contact adjacent heat transfer units. Each fin unit defines a longitudinally-oriented air flow passage, the air flow passages having a first air flow area at an air inlet end and a second air flow area at an air outlet end, the first air flow area greater than the second air flow area. The fins of the fin units converge in the direction of the air flow through the passage so that the pitch of the fins at the air inlet end of is greater than the pitch of the fins at the air outlet end.

6 Claims, 5 Drawing Sheets

(51) Int. Cl.
*F02B 29/04* (2006.01)
*F28F 13/08* (2006.01)
*F28D 7/00* (2006.01)
*F28D 7/16* (2006.01)

(52) U.S. Cl.
CPC .............. *F28F 1/12* (2013.01); *F28F 1/126* (2013.01); *F28F 13/08* (2013.01); *F28D 7/1684* (2013.01); *Y02T 10/146* (2013.01)

(58) Field of Classification Search
CPC ... F02M 13/20; F02B 29/0462; F28D 7/0041; F28D 7/1684; Y02T 10/146
USPC ......... 165/151, 148, 149, 152, 147; 123/563
See application file for complete search history.

(56) References Cited

U.S. PATENT DOCUMENTS

| | | | | |
|---|---|---|---|---|
| 4,373,577 A | * | 2/1983 | McMillen | F28D 1/0358 165/122 |
| 4,616,695 A | * | 10/1986 | Takahashi et al. | 165/54 |
| 4,823,867 A | * | 4/1989 | Pollard et al. | 165/166 |
| 5,078,206 A | * | 1/1992 | Goetz, Jr. | F28D 1/0426 123/41.49 |
| 5,157,941 A | * | 10/1992 | Cur et al. | 62/441 |
| 5,172,752 A | * | 12/1992 | Goetz, Jr. | F28D 1/0426 123/41.49 |
| 5,236,336 A | * | 8/1993 | Hitoshi | 165/153 |
| 5,947,195 A | * | 9/1999 | Sasaki | 165/173 |
| 6,925,829 B2 | * | 8/2005 | Wei | 62/259.2 |
| 6,973,965 B2 | * | 12/2005 | Meshenky | F02B 29/0462 165/125 |
| 7,111,673 B2 | * | 9/2006 | Hugill | B01D 3/14 165/147 |
| 7,506,683 B2 | * | 3/2009 | Hu | 165/140 |
| 2006/0196649 A1 | * | 9/2006 | Shibata et al. | 165/166 |
| 2006/0218936 A1 | * | 10/2006 | Kobayashi et al. | 62/3.1 |
| 2007/0095503 A1 | | 5/2007 | Sinha et al. | |
| 2007/0270095 A1 | * | 11/2007 | Shimoyama et al. | 454/148 |
| 2009/0133860 A1 | | 5/2009 | Harada et al. | |
| 2011/0198061 A1 | * | 8/2011 | Chen et al. | 165/104.34 |

FOREIGN PATENT DOCUMENTS

| | | |
|---|---|---|
| EP | 0545842 A1 | 6/1993 |
| GB | 2435902 A | 9/2007 |
| JP | 09264145 | 10/1997 |
| JP | 2006329519 A | 12/2006 |
| JP | 2008045765 A | 2/2008 |
| WO | 2012104058 A1 | 8/2012 |

OTHER PUBLICATIONS

Intellectual Property Office, Search Report for the corresponding Great Britain Application No. GB1204677.7 mailed Jun. 28, 2012.
State Intellectual Property Office of People's Republic of China, Notification of First Office Action for the Chinese Patent Application No. 2013101181226 dated Feb. 19, 2016.
State Intellectual Property Office PRC, Second Office Action for the corresponding Chinese Patent Application No. 201310118122.6 mailed Oct. 18, 2016.
State Intellectual Property Office PRC, English translation of Second Office Action for the corresponding Chinese Patent Application No. 201310118122.6 dated Oct. 18, 2016.

* cited by examiner

GAS-TO-LIQUID HEAT EXCHANGER

CROSS-REFERENCE TO RELATED APPLICATIONS

This application claims priority to British Appln. No. 1204677.7, filed Apr. 5, 2012, the disclosure of which is incorporated in its entirety by reference herein.

TECHNICAL FIELD

This invention relates to heat exchangers and in particular to a heat exchanger for use as an engine charge air cooler.

BACKGROUND

It is known to provide a boosted engine of a motor vehicle with a charge cooler to cool the air before it is inducted into the engine. In a conventional arrangement the air charge cooler (often referred to as an intercooler) is mounted at the front of the motor vehicle and the charge air is cooled by air passing over it as the motor vehicle moves through the air. Such intercoolers need to be large due to their low efficiency and are difficult to package on the motor vehicle. Such intercoolers generally require a large diameter air flow conduit extending from the front of the vehicle to the engine and the source of charge air. Furthermore, unless a means to force air through the intercooler is provided, the amount of cooling available may be limited when the motor vehicle is stationary or travelling at low speed. In addition, the amount of cooling available is affected by the temperature of the ambient air passing through the charge cooler and so, when the engine must operate at high load in a high ambient temperature, a larger charger cooler has to be used than is necessary for operation in a lower ambient temperature.

To overcome such problems it is known to provide an air-to-liquid type of heat exchanger often referred to as a Water Cooled Charge Air Cooler (WCCAC) to cool the charge air before it is drawn into the engine. With such a WCCAC cooler the charge air passes through an enclosed box or housing to cool the air. The housing contains a heat exchanger having a number of passages through which liquid coolant passes and fins thermally coupled to the passages over which the charge air passes to cool it.

Such known heat exchangers are normally rectangular or square in shape and the charge air flow area of the heat exchanger where the charge air enters the heat exchanger is substantially the same as the charge air flow area where the charge air exits the heat exchanger.

SUMMARY

It is an object of this invention to provide a heat exchanger of the gas-to-liquid type having improved efficiency.

According to a first disclosed embodiment, a heat exchanger fin-and-tube block has a first air flow area at an air inlet end and a second air flow area at an air outlet end, the first air flow area greater than the second air flow area.

According to another embodiment, the air inlet has a first width and the air outlet end has a second width, the first width greater than the second width According to another embodiment, the fin-and-tube block is trapezoidal.

According to another embodiment, the fin-and-tube block comprises a plurality of heat transfer units for carrying a liquid. The heat transfer units are oriented in a transverse direction of the fin-and-tube block. Fin units are disposed between and contacts adjacent pairs of the heat transfer units, the fin units defining air flow passages oriented in a longitudinal direction of the fin-and-tube block.

According to another embodiment, at least one of the heat transfer units comprises a flat plate having a number of passages integrally formed therein in a side-by-side relationship, the at least one heat transfer unit being orientated such that the passages extend in the transverse direction.

According to another embodiment, at least one of the fin units comprises a plurality of fins that converge in the direction of the air flow through the fin-and-tube block so that the pitch of the fins at the air inlet end of is greater than the pitch of the fins at the air outlet end.

According to another embodiment, at least one of the fin units comprises a corrugated lamella sheet forming a number of fins.

According to a disclosed embodiment, the fin-and-tube block is part of an intercooler for a boosted internal combustion engine.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

FIG. 2d is a side view of the heat exchanger shown in FIG. 2a in the direction of arrow 'Z' on FIG. 2a;

FIG. 5c is a graph showing the velocity of the charge air as it passes through the heat exchanger shown in FIG. 5a;

FIG. 5d is a graph showing the temperature of the charge air as it passes through the heat exchanger shown in FIG. 5a;

FIG. 5e is a graph showing the vane or fin density of the heat exchanger shown in FIG. 5a;

FIG. 6c is a graph showing the velocity of the charge air as it passes through the heat exchanger shown in FIG. 6a;

FIG. 6d is a graph showing the temperature of the charge air as it passes through the heat exchanger shown in FIG. 6a; and FIG. 6e is a graph showing the vane or fin density of the heat exchanger shown in FIG. 6a.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
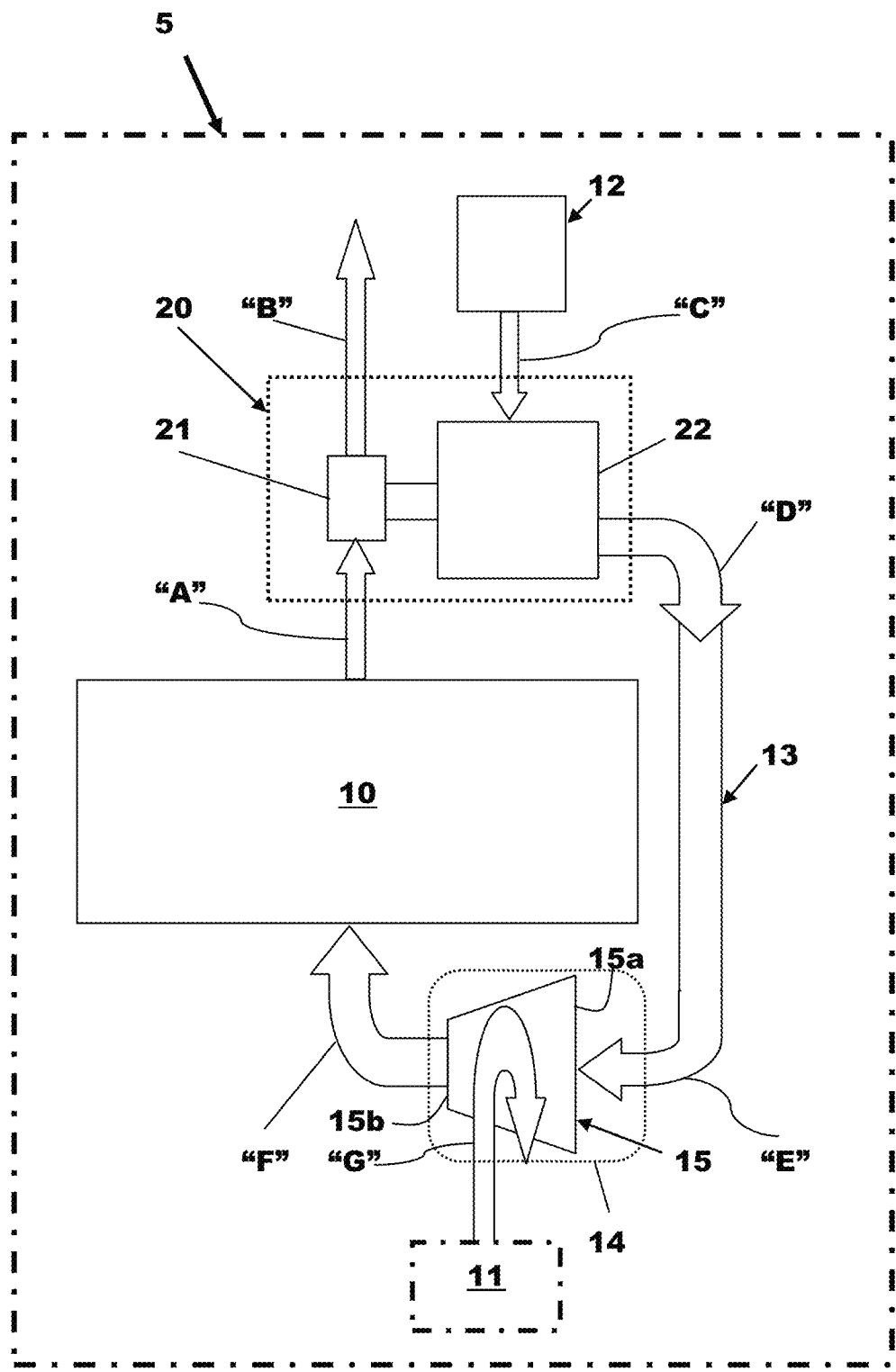
FIG. 1 is a schematic diagram of an engine system according to a second aspect of the invention having a heat exchanger according to a first aspect of the invention.

Referring firstly to FIG. 1 there is shown an engine system 5 having a boosted engine 10. The engine 10 is in this case boosted by a turbocharger 20 having an exhaust gas turbine 21 driving an air compressor 22. It will however be appreciated that the turbocharger 20 could be replaced by a supercharger (not shown).

Exhaust gas exits the engine as indicated by the arrow "A" and flows through the turbine 21 causing it to rotate the air compressor 22 as is well known in the art. After passing through the turbine 21 the exhaust gas exits to atmosphere as indicated by the arrow "B" after normally passing through one or more emission control devices (not shown) and one or more silencers (not shown).

The rotation of the air compressor 22 causes it to draw air in via an air filter 12 as indicated by the arrow "C". The air is compressed in the air compressor 22 and flows out as charge air, as indicated by the arrow "D", and flows through an air transfer pipe 13 so as to enter a sealed housing 14 (shown as a dotted outline on FIG. 1) as indicated by the arrow "E". A trapezoidal shape heat exchanger 15 is mounted in the sealed housing 14 and the charge air enters the heat exchanger 15 at an inlet end 15a and exits the heat exchanger at an outlet end 15b. A supply of liquid coolant such as water from a cooling system 11 (shown as a dot-dash outline on FIG. 1) of the engine 10 circulates through the heat exchanger 15 so as to cool the charge air passing therethrough as indicated by the arrow "G". After exiting the heat exchanger 15 the cooled charge air flows directly to an inlet manifold of the engine 10 as indicated by the arrow "F". Note that the housing 14 is close coupled to the air intake of the engine 10 so that the amount of air ducting required is considerably reduced. It will be appreciated that, as is well known in the art, the engine cooling system 11 may include one or more radiators, a coolant circulation pump and valve means to control the flow of coolant through the radiator(s) and engine 10.

Referring now to FIGS. 2a to 2d there is shown a trapezoidal fin-and-tube block heat exchanger 15 having an air inlet end 15a of width 'W1' and overall height 'Ht', an air outlet end 15b of width 'W2', and overall height 'Ht' and a length 'L'.

The fin-and-tube block 15 comprises of a number of heat transfer units 31, 32, 33, 34 oriented in a generally transverse direction of the fin-and-tube block 15 and through which in use a liquid heat transfer fluid (such as water-based coolant) flows.

Fin units 41, 42, 43 are disposed between each adjacent pair of heat transfer units 31, 32, 33, 34. Each fin unit 41, 42, 43 has a number of vanes or fins defining air flow passages through which air flows in a generally longitudinal direction of the fin-and-tube block 15. The air flows from the air inlet end 15a to the air outlet end 15b.

The heat transfer units 31, 32, 33, 34 are arranged parallel to one another so as to define uniform gaps of height 'H' therebetween in which the fin units 41, 42, 43 are fitted.

Each of heat transfer units 31, 32, 33, 34 comprises a flat, thermally conductive metal plate having a number of passages integrally formed therein in a side-by-side relationship. That is to say, a number of micro-bores extend through each flat plate and these micro-bores form passages through which liquid coolant flows in use. The heat transfer units 31, 32, 33, 34 can conveniently be produced by extruding aluminum or an aluminum alloy material with integral micro-bores.

It will be appreciated that each heat transfer unit 31, 32, 33, 34 could alternatively be formed by a number of individual tubes placed in a side by side relationship and secured together by brazing to form a tube pack. However, the use of a micro-bore plate is preferred due to the ease of manufacture and reduced complexity compared to the use of a tube pack.

Irrespective of the construction chosen for each heat transfer unit 31, 32, 33, 34, the heat transfer units 31, 32, 33, 34 are orientated such that the passages extend in a transverse direction of the fin-and-tube block 15. That is to say, the flow of liquid coolant through the heat transfer units 31, 32, 33, 34 is transversely arranged with respect to the flow of air through the fin-and-tube block 15.

In the preferred embodiment shown, each fin unit 41, 42, 43 comprises a single, corrugated lamella sheet made from a thermally conductive metal such as aluminum or an alloy thereof. Each corrugated lamella plate is thermally coupled to the adjacent heat transfer units 31, 32; 32, 33; and 33, 34 respectively by brazing. The use of a thin sheet of material having a high thermal conductivity for the corrugated fin units 41, 42, 43 and the fastening of the corrugated fin units 41, 42, 43 to the heat transfer units 31, 32, 33, 34 ensures good conduction of heat from the air flowing through the fin-and-tube block 15 via the corrugated fin units 41, 42, 43 to the heat transfer units 31, 32, 33, 34 thereby maximizing the cooling of the air as it flows through the fin-and-tube block.

In addition, by fastening the heat transfer units 31, 32, 33, 34 and the corrugated fin units 41, 42, 43 together, a fin-and-tube block 15 is produced having good mechanical strength without the need for a reinforcing frame.

Figure 2C:
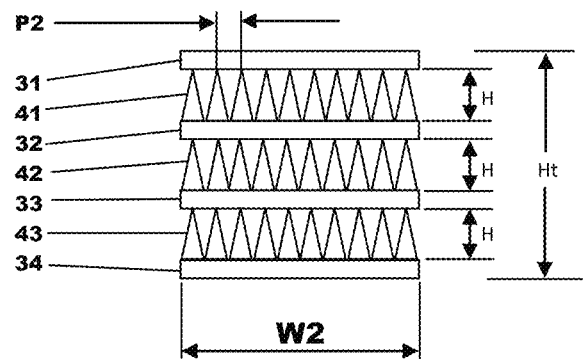
FIG. 2c is an end view of the heat exchanger shown in FIG. 2a in the direction of arrow 'Y' on FIG. 2a showing an outlet end of the heat exchanger.
Figure 2D:
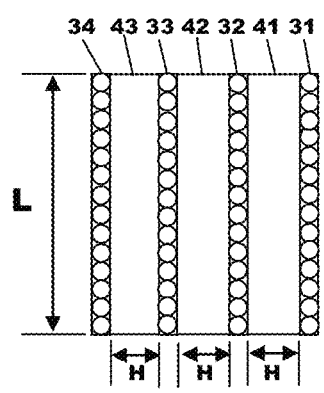
Figure 2A:
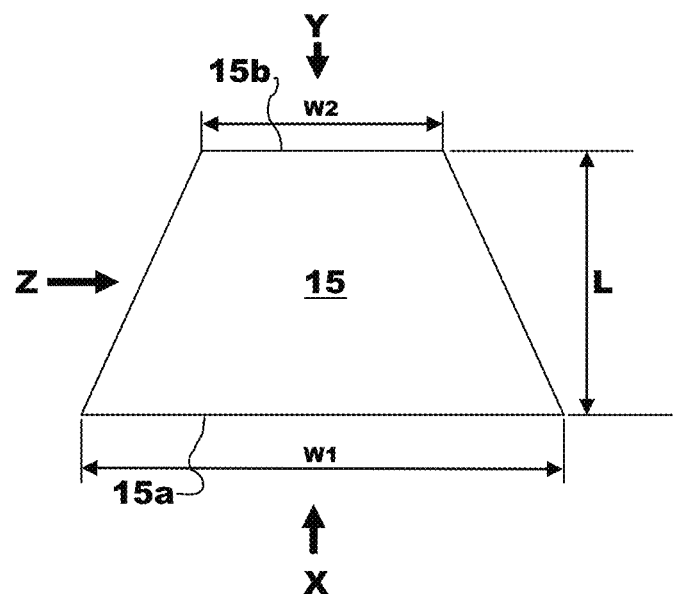
FIG. 2a is a schematic plan view of a heat exchanger according to the first aspect of the invention.
Figure 3:
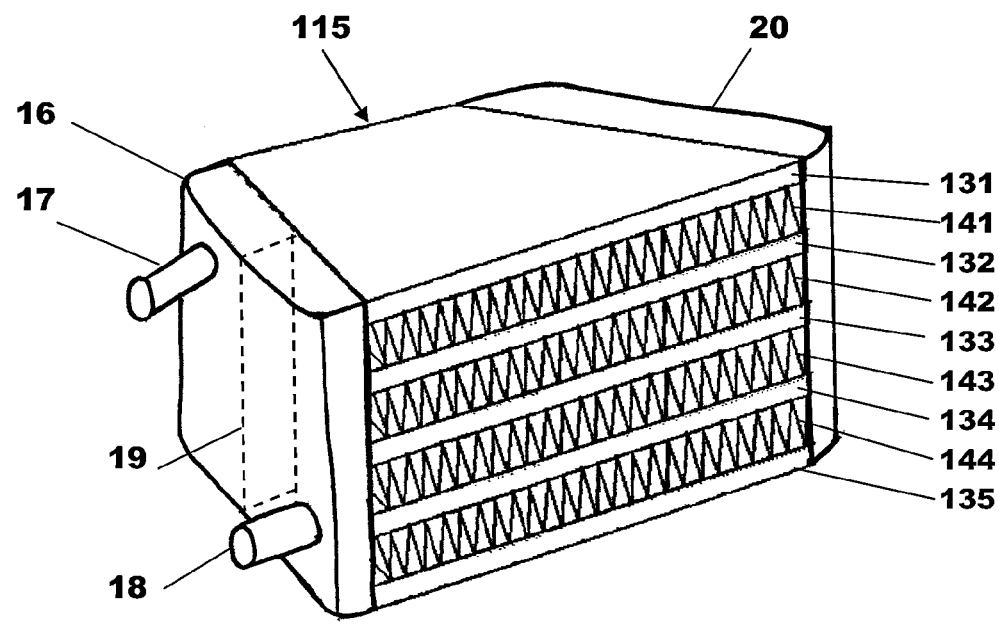
FIG. 3 is a pictorial view of a charge air cooler assembly for a boosted engine having a heat exchanger of the type shown in FIGS. 2a to 2d.
Figure 4:
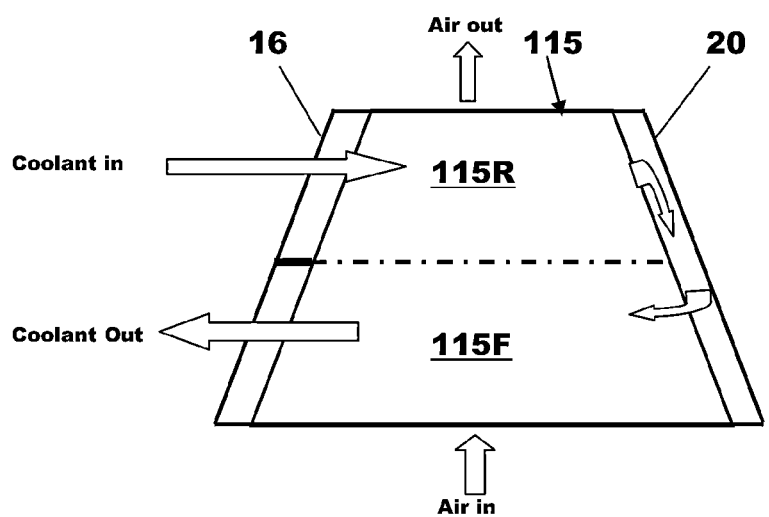
FIG. 4 is a plan view of the intercooler assembly shown in FIG. 3 showing the direction of liquid coolant flow through the heat exchanger and the direction of charge air flow through the heat exchanger.

As best seen in FIGS. 2a, 3 and 4 each of the flat plates forming the heat transfer units 31, 32, 33, 34 is generally trapezoidal in shape, and in this case is in the form of a trapezoid. The peripheral edges of the corrugated fin units 41, 42, 43 likewise have a similar trapezoidal shape matching that of the heat transfer units.

The individual fins of each fin unit 41, 42, 43 converge in the airflow direction (defined herein as the direction of the air flow through the fin-and-tube block 15) so that the pitch P1 (see FIG. 2b) of the fins at the air inlet end 15a of the fin-and-tube block 15 is greater than the pitch P2 (see FIG. 2c) at the air outlet end 15b of the fin-and-tube block 15. That is to say, the density of fins at the air outlet end 15b is greater than the density of fins at the air inlet end 15a.

Although the fin units are in this preferred embodiment formed from a single corrugated piece of highly thermally conductive sheet metal, it will be appreciated that separate fins individually fastened to the heat transfer units 31, 32, 33, 34 could be used, but the complexity and cost of manufacture would then be considerably increased.

FIGS. 3 and 4 both show a fin-and-tube heat exchanger of the type described above as part of an air charge cooler or intercooler for a boosted engine such as the engine 10 shown in FIG. 1.

The construction of the fin-and-tube block 115 is the same as the fin-and-tube block 15 shown in FIGS. 2a to 2d with the exception that there are five heat transfer units 131, 132, 133, 134, 135 (rather than four) and four fin units 141, 142, 143, 144 (rather than three).

A liquid coolant manifold 16 fits over and is sealingly attached to one transverse end of the fin-and-tube block 115 and a coolant transfer tank 20 fits over and is sealingly attached to an opposite transverse end of the fin-and-tube block 115.

The coolant manifold 16 and the coolant transfer tank 20 are both sealingly attached by brazing to the ends of the heat transfer units 131, 132, 133, 134, 135 and the fin units 141, 142, 143, 144, 145 of the fin-and-tube block 115.

Coolant such as water or a water/glycol mix is supplied to the liquid coolant manifold 16 through a tube 17 from a supply of coolant such as the cooling system 11 of the engine 10 and is returned to the cooling system 11 via an outlet pipe 18. The coolant manifold 16 includes an internal partition 19 that is sealingly connected to the respective end of the fin-and-tube block 115 to which the coolant manifold 16 is attached. The partition 19 divides the coolant manifold 16 into inlet and outlet sides and divides the fin-and-tube block 115 into rear and front portions 115R and 115 F so far as coolant flow is concerned.

In use, as shown by the arrows on FIG. 4, liquid coolant flows into all of the passages of the heat transfer units 131, 132, 133, 134, 135 in the rear portion 115R via the inlet pipe 17 and the inlet side of the coolant manifold 16, through the respective passages and out into the transfer tank 20 so as to make a first pass through the fin-and-tube heat exchanger 115. The coolant then flows from the transfer tank 20 through all of the passages of the heat transfer units 131, 132, 133, 134, 135 in the front portion 115F of the fin-and-tube block 115 into the outlet side of the coolant manifold 16 so as to make a second pass through the fin-and-tube block 115 and then out via the outlet pipe 18.

The heat exchanger formed by the fin-and-tube block 115, coolant manifold 16 and transfer tank 20 is fitted in a sealed metal housing (not shown) so as to form in combination an air charge cooler or intercooler assembly.

Although the embodiment is described by way of example as having a separate housing, it will be appreciated that the housing could be partially formed as an integral part of the fin-and-tube block 115 with end tanks attached to the air inlet and air outlet ends.

The housing has an inlet to admit charge air to the housing and an outlet to allow cooled charge air to exit the housing. The outlet of the housing is preferably coupled to an intake manifold or other induction housing of the engine 10 so as to minimize the distance between the intercooler assembly and the engine 10. Any charge air passing through the housing has to flow through the fin-and-tube block 115 and the charge air is thereby cooled prior to induction by the engine 10. The inlet and outlet pipes 17 and 18 extend through one of the walls forming the housing and are sealed to the housing so as to prevent air from escaping from the housing.

It will be appreciated that other liquid coolant flow path arrangements could be used and the invention is not limited to the coolant flow path arrangement described above or to the use of a coolant manifold and transfer tank of the type shown and described.

The advantageous effects of a heat exchanger constructed in accordance with this invention will now be described with reference to FIGS. 5a to 5e and 6a to 6e which are corresponding figures for a prior art rectangular fin-and-tube block 1 and the trapezoidal fin-and-tube block 115 previously described.

Figure 5A:
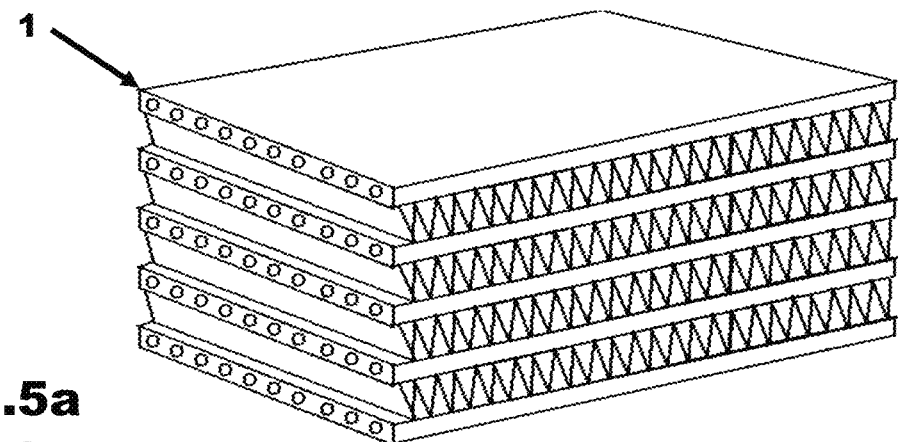
FIG. 5a is a pictorial view of a prior art gas-to-liquid heat exchanger.
Figure 5B:
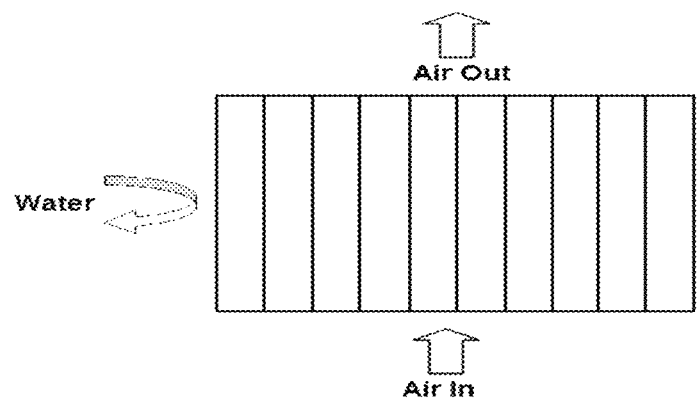
FIG. 5b is a plan view of the heat exchanger shown in FIG. 5a showing the direction of charge air flow through the heat exchanger.

For cost and simplicity reasons, known heat exchangers normally have straight fins and are arranged in square or rectangular assemblies such as the rectangular assembly 1 shown in FIGS. 5a and 5b.

By way of example and without limitation, for a typical charge cooler application the intercooler assembly may be required to cool the charge air from approximately 180° C. (453° K) down to approximately 45° C. (318° K).

When the charge air is cooled, it contracts and its density increases. Because it contracts as it passes through the intercooler the speed of the charge air reduces.

This variation in speed can be estimated using Boyles Ideal Gas equation:

$$P_1 V_1 / T_1 = P_2 V_2 / T_2 \tag{1}$$

Where: —
$V_1$ is the volume of the air entering the intercooler;
$V_2$ is the volume of the air exiting the intercooler;
$T_1$ is the temperature of the air entering the intercooler;
$T_2$ is the temperature of the air exiting the intercooler;
$P_1$ is the pressure of the air entering the intercooler; and
$P_2$ is the pressure of the air exiting the intercooler;

In the case of flow through an intercooler an approximate result can be obtained by assuming that $P_1 = P_2$.

Therefore by rearranging equation 1 we get $$V_2 = V_1 * (T_2 / T_1) = V_1 * (318/453) = 0.7\ V_1 \tag{2}$$

Therefore, in this example, the air volume at the outlet of the fin-and-tube block 1 will be approximately 30% smaller than the air volume at the inlet of the intercooler.

By using the fluid flow continuity equation:

$$Q = \rho * A * U \tag{3}$$

It can be deduced that if the mass flow rate through a conduit is constant:

$$\rho_1 * A_1 * U_1 = \rho_2 * A_2 * U_2,$$

which can be rearranged as:

$$U_1 = (\rho_2 * A_2 * U_2) / (\rho_1 * A_1).$$

And if the flow areas at entry and exit from the conduit are the same this reduces to:

$$U_1 = (\rho_2 / \rho_1) * U_2. \tag{4}$$

And then by using the result from equation 2, and the relationships:

$\rho_1 = 1/V_1$ and $\rho_2 = 1/V_2$ and substitution into equation 4

Where:
Q=mass flow rate through a conduit;
$\rho_1$ and $\rho_2$=density of gas at entry and exit respectively of a conduit;
$A_1$ and $A_2$=area of the actual flow conduit at entry and exit respectively; and
$U_1$ and $U_2$=velocity of flow through the conduit at entry and exit respectively.

Figure 5C:
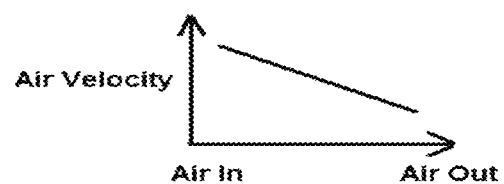

It can be deduced that the velocity of the air is also approximately 30% less at the outlet for a prior art heat exchanger of the type shown in FIG. 5a as shown in FIG. 5c.

Figure 5D:
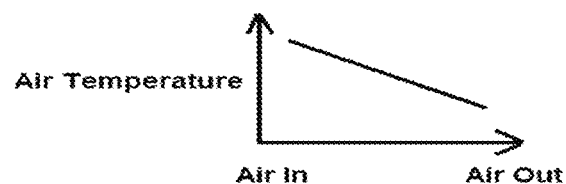
Figure 5E:
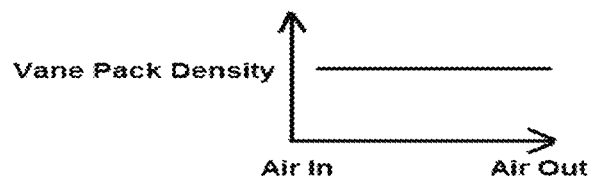

This is because the air flow area is the same at the inlet and outlet of such a heat exchanger and the fin or vane pack density is constant as indicated in FIG. 5e.

Because aerodynamic drag and pressure drop are related to Velocity squared, the aerodynamic drag losses could be expected to half in this case. That is to say, drag at outlet is $0.7^2 \sim 0.5$ inlet drag.

FIG. 5d shows the temperature drop as the air passes through the fin-and-tube block 1.

For a prior art arrangement having constant air flow area passages the velocity therefore reduces considerably as the air passes through the fin-and-tube block 1 because the fin spacing is constant and such an arrangement is not optimal.

Figure 6A:
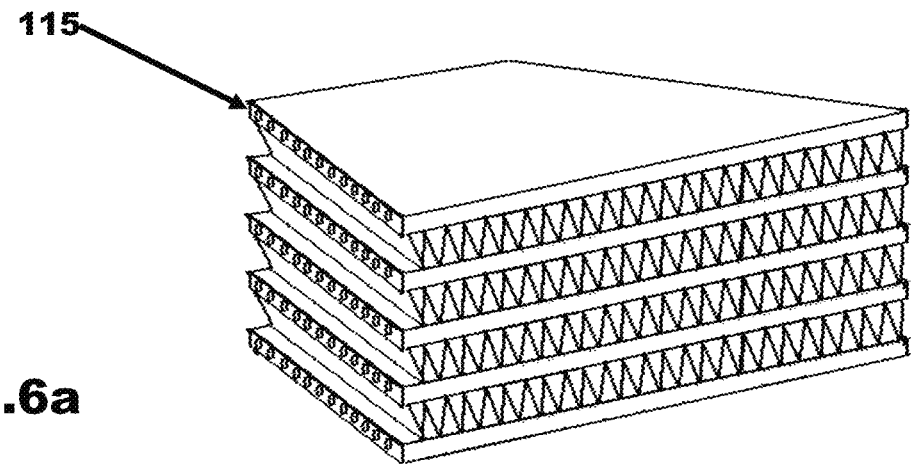
FIG. 6a is a pictorial view of an gas-to-liquid heat exchanger constructed in accordance with said first aspect of the invention.
Figure 6B:
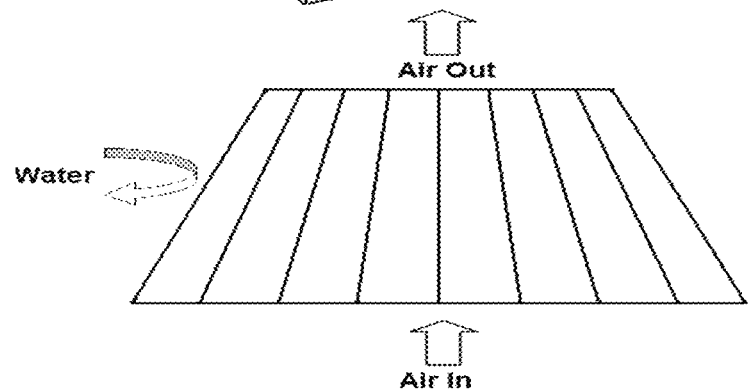
FIG. 6b is a plan view of the heat exchanger shown in FIG. 6a showing the direction of charge air flow through the heat exchanger.
Figure 6C:
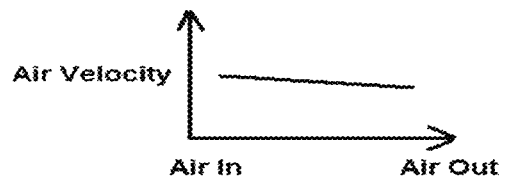
Figure 6D:
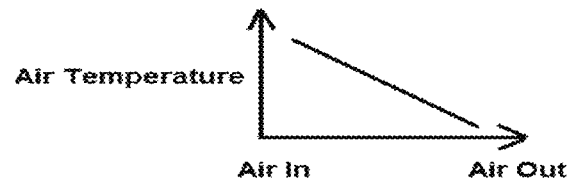
Figure 6E:
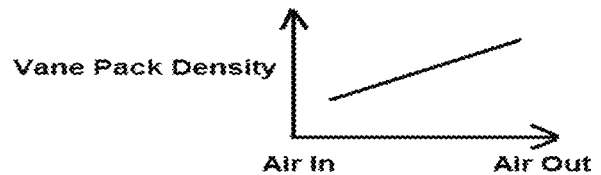

As shown in FIGS. 6a and 6b by varying the spacing or pitch of the fins, by using a wider spacing at the inlet end compared to the outlet end, there is a smaller reduction in air velocity compared to the prior art fin-and-tube block 1 (compare FIG. 6c with FIG. 5c).

Because there are the same number of fins at the inlet and outlet ends of the trapezoidal fin-and-tube block 115 meaning that there are the same number of airflow passages, the width of the fin-and-tube block is greater at the inlet end than it is at the outlet end (see reference numerals 'W1' and 'W2' on FIGS. 2a, 2b and 2c) and the height of the fins is constant this means that the air flow area at the inlet end of the fin-and-tube block 115 is greater than at the outlet end.

Figure 2B:
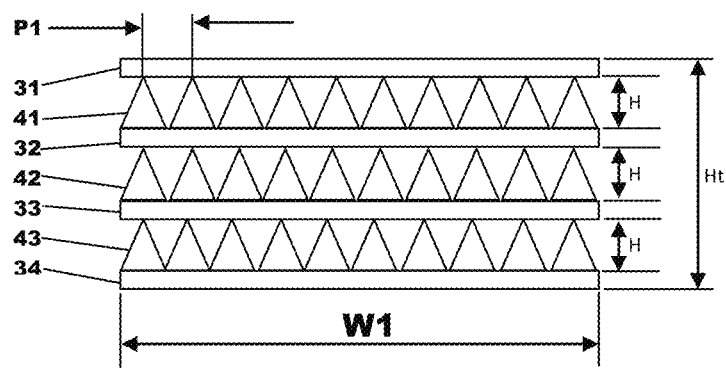
FIG. 2b is an end view of the heat exchanger shown in FIG. 2a in the direction of arrow 'X' on FIG. 2a showing an inlet end of the heat exchanger.

The air flow areas for the fin-and-tube block 15 shown in FIGS. 2a to 2b can be calculated as follows.

$$AA_1 = (3*H*W1) - (Af_1); \text{ and}$$

$$AA_2 = (3*H*W2) - (Af_2)$$

Where: —
$AA_1$=Air flow area at the inlet end of the trapezoidal fin-and-tube block;
H=height of fins;
W1=width at the inlet end of the trapezoidal fin-and-tube block exposed to air flow;
$Af_1$=total area of fins blocking flow at the inlet end of the trapezoidal fin-and-tube block;
$AA_2$=Air flow area at the outlet end of the trapezoidal fin-and-tube block;
H=height of fins;
W2=width at the outlet end of the trapezoidal fin-and-tube block exposed to air flow; and
$Af_2$=total area of fins blocking flow at the outlet end of the trapezoidal fin-and-tube block.

Because W1 is greater than W2 and all of the other integers are substantially constant, the air flow area at the inlet end will be greater than the air flow area at the outlet end.

Therefore by using a heat exchanger having the characteristic that the outlet flow area is less than the inlet flow area, the heat exchanger can be optimized to suit its particular application in terms of package size, pressure drop and thermal efficiency.

One advantage of the invention is that by balancing package size, pressure drop and thermal efficiency a heat exchanger with idealized performance for the particular application can be produced.

One further advantage of the use of a trapezoidal shape is that a heat exchanger so constructed will direct the air towards a point thereby improving the flow of air into any downstream components.

Depending upon the manner in which the heat exchanger is optimized, further advantages of the invention may include:

A smaller package volume for the same cooling effect;
Lower weight due to reduced size;
More efficient cooling;
Minimal or nil piece-cost impact compared to a prior art heat exchanger for the same use.

Although the invention has been described with particular reference to its use as an intercooler for a boosted engine it will be appreciated that the invention is not limited to use as an intercooler and that the invention may be applied with advantage to other uses requiring a gas-to-liquid heat exchanger.

It will be further appreciated that the material from which the fin-and-tube block is constructed need not be aluminum or an alloy thereof and that other metals having a high thermal conductivity and suitable mechanical properties could be used.

Although the invention has be shown and described with reference to the use of a heat exchanger having a trapezoidal shape having equal angles to each side of a longitudinal axis forming an axis of symmetry, it will be appreciated that other shapes could be used to produce a heat exchanger having different inlet and outlet areas and that the invention is not limited to a trapezoidal shaped heat exchanger having equal angles.

It will be further appreciated that the arrangement of the fins may not necessarily be "V"-shaped they could be arranged in a "U"-shaped pattern or some other pattern such as sinusoidal and that the invention is not therefore limited to the use of a "V"-shaped fin pattern.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An intercooler for an internal combustion engine comprising:
    a plurality of heat transfer plates arranged parallel to one another to define gaps therebetween, the plates having respective first parallel edges coinciding with an air inlet end and second parallel edges shorter than the first parallel edges coinciding with an air outlet end, each plate having internal passages carrying a liquid coolant and extending transverse to an airflow direction between the plates; and
    a plurality of fin units disposed in the gaps and contacting adjacent pairs of the plates, at least one of the fin units comprising a plurality of fins extending along the airflow direction, adjacent fins converging with one another along the airflow direction such that a first spacing between adjacent fins at the air inlet end is greater than a second spacing between adjacent fins at the air outlet end, and such that adjacent fins define therebetween a plurality of airflow passages, respective airflow passages having an inlet area greater than an outlet area, the inlet and outlet areas measured perpendicular to the airflow direction.

2. The intercooler of claim 1 wherein the at least one fin unit comprises a corrugated lamella sheet forming the plurality of fins.

3. An air-to-liquid heat exchanger comprising:
    a fin unit comprising a plurality of fins extending along an airflow direction, adjacent fins converging with one another along the airflow direction to define therebetween a plurality of airflow passages, respective airflow passages having an inlet area greater than an outlet area, the inlet and outlet cross-sectional areas measured perpendicular to the airflow direction;

first and second plates contacting respective opposite sides of the fin unit and having respective first parallel edges coinciding with inlet ends of the airflow passages and second parallel edges shorter than the first parallel edges and coinciding with outlet ends of the airflow passages, each plate having internal passages extending transverse to the airflow direction and carrying a liquid coolant and;

first and second manifolds attached to the plates in fluid communication with the internal passages.

4. The air-to-liquid heat exchanger of claim 3 wherein the fin unit comprises a corrugated lamella sheet forming the fins.

5. A heat exchanger comprising:
two trapezoidal plates having first parallel edges defining a first width at an air inlet end and second parallel edges shorter than the first parallel edges defining a smaller second width at an air outlet end, and internal fluid passages extending transverse to an airflow direction between the plates; and a plurality of fins extending along the airflow direction, adjacent fins converging with one another along the airflow direction such that airflow passages defined between adjacent fins have an inlet area greater than an outlet area.

6. A heat exchanger comprising:
two plates having an air inlet end and an air outlet end smaller in width than the intel end, and internal fluid passages extending transverse to an airflow direction between the plates; and a corrugated lamella sheet having a plurality of fins extending along the airflow direction, adjacent fins converging along the airflow direction to define airflow passages between adjacent fins that have an inlet area greater than an outlet area.

\* \* \* \* \*

UNITED STATES PATENT AND TRADEMARK OFFICE
CERTIFICATE OF CORRECTION

| | | |
|---|---|---|
| PATENT NO. | : 9,593,647 B2 | |
| APPLICATION NO. | : 13/855233 | |
| DATED | : March 14, 2017 | |
| INVENTOR(S) | : Anthony Bernard Demots et al. | |

It is certified that error appears in the above-identified patent and that said Letters Patent is hereby corrected as shown below:

In the Claims

Column 10, Line 12, Claim 6:
Delete "...smaller in width than the intel end..."
Replace with "...smaller in width than the inlet end..."

Signed and Sealed this
Second Day of May, 2017

Michelle K. Lee
*Director of the United States Patent and Trademark Office*